Figure 1:
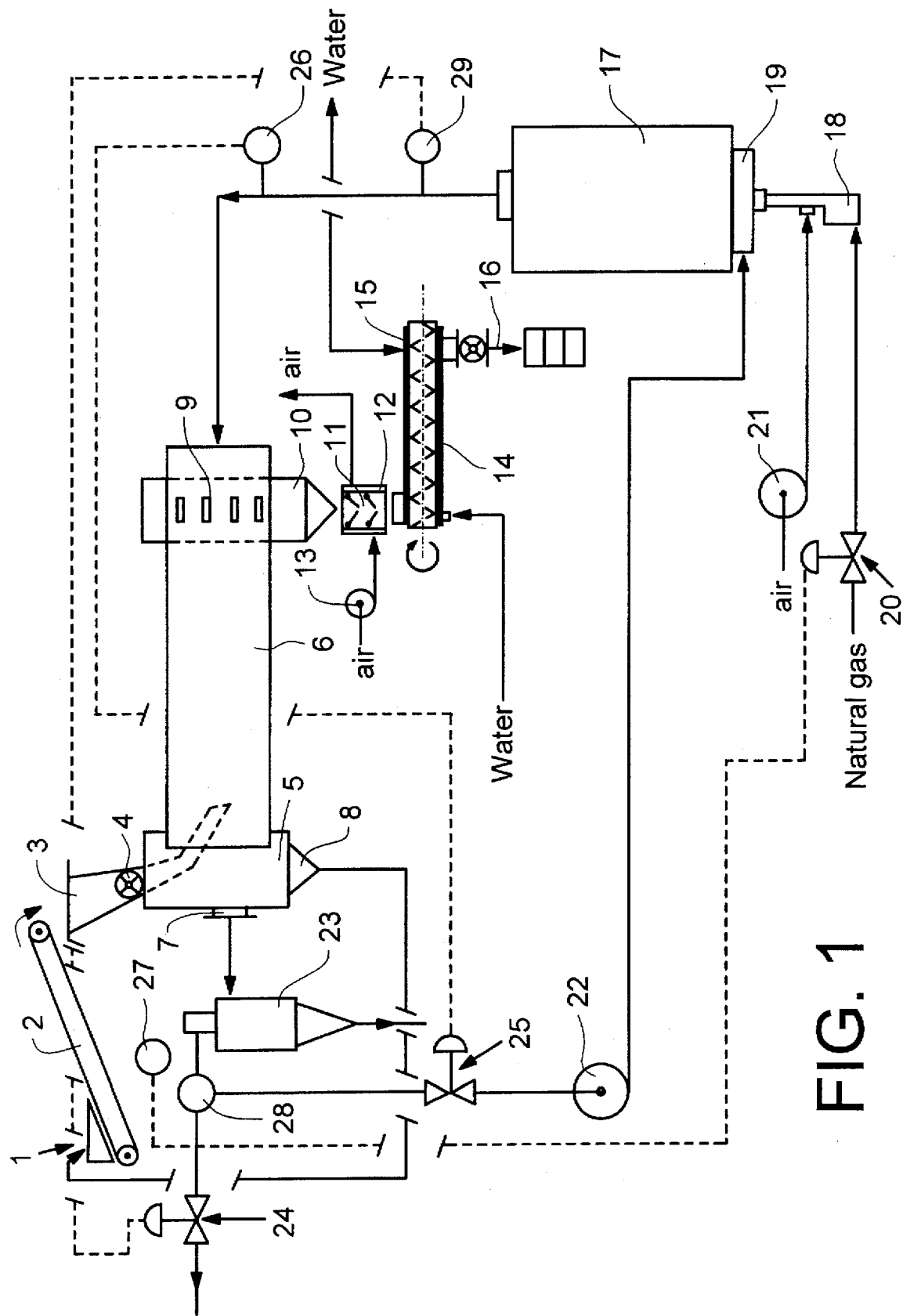

United States Patent [19]

Leman

[11] Patent Number: 5,719,101
[45] Date of Patent: Feb. 17, 1998

[54] POROUS GRANULAR MATERIAL OBTAINED FROM WOOL SCOURING LIQUOR, METHOD FOR THE MANUFACTURE THEREOF AND APPLICATIONS

[75] Inventor: Bernard Leman, Roubaix, France

[73] Assignee: Peignage Amedee, Roubaix, France

[21] Appl. No.: 433,430

[22] PCT Filed: Sep. 8, 1994

[86] PCT No.: PCT/FR94/01061

§ 371 Date: May 8, 1995

§ 102(e) Date: May 8, 1995

[87] PCT Pub. No.: WO95/07753

PCT Pub. Date: Mar. 23, 1995

[30] Foreign Application Priority Data

Sep. 13, 1993 [FR] France ................. 93 10844

[51] Int. Cl.$^6$ .............. B01J 20/02; B01J 20/10
[52] U.S. Cl. ............ 502/427; 502/400; 502/407; 502/409; 502/410; 502/411; 502/413; 502/416; 502/417; 502/437; 502/439
[58] Field of Search ................. 502/409, 410, 502/416, 413, 411, 439, 427, 437, 417, 400, 407

[56] References Cited

U.S. PATENT DOCUMENTS

| | | | |
|---|---|---|---|
| 2,069,164 | 1/1937 | Vogel-Jorgensen | 34/137 |
| 4,544,650 | 10/1985 | Kinder et al. | 502/424 |
| 4,794,097 | 12/1988 | Marty et al. | 502/167 |

FOREIGN PATENT DOCUMENTS

| | | | |
|---|---|---|---|
| 899849 | 12/1984 | Belgium. | |
| 0398298 | 11/1990 | European Pat. Off. | B09B 3/00 |
| 709860 | 8/1931 | France. | |
| 1457472 | 11/1966 | France. | |
| 2461687 | 2/1981 | France | C04B 21/00 |
| 3918717 | 12/1990 | Germany | B01J 20/30 |
| 2140790 | 12/1984 | United Kingdom | C04B 21/06 |

*Primary Examiner*—Glenn Caldarola
*Assistant Examiner*—In Suk Bullock
*Attorney, Agent, or Firm*—Burns, Doane, Swecker & Mathis, L.L.P.

[57] ABSTRACT

The porous granular material according to the invention comprises carbon, silica, water-soluble mineral salts and water-insoluble mineral salts, does not disintegrate in the presence of water and has a particle size of approximately 1 to 5 mm, preferably from 1 to 3 mm, in particular from 1 to 2 mm; a crushing strength, or mechanical strength, in the range of 0.75 to 1 MPa; a density of between 0.7 and 0.8; a BET specific surface area of between 100 and 200 m$^2$/g; a microporous volume of between 0.25 and 1 cm$^3$/g; and a carbon content of 8 to 11 weight %, the balance being essentially made up by a mineral matrix of base nature, comprising a crystalline phase of insoluble aluminosilicates.

Application, in particular, to the purification of liquids, as a catalyst in oxidation reactions and in the manufacture of composite catalysts, in particular in petrochemistry.

20 Claims, 2 Drawing Sheets

POROUS GRANULAR MATERIAL OBTAINED FROM WOOL SCOURING LIQUOR, METHOD FOR THE MANUFACTURE THEREOF AND APPLICATIONS

The invention relates to the valorization of the residues obtained after de-polluting wool scouring water or liquor.

It relates more especially to a porous, granular material that can be used, in particular, as an absorbent product and as a catalyst support, for example in petrochemistry, in particular for sweetening gasolines.

The invention also relates to a process for the manufacture of this porous, granular material and to the applications of this material.

Raw wool obtained after sheep shearing contains foreign materials such as wool grease (a mixture of esters of alcohols and fatty acids, insoluble in water), suint (a mixture of water soluble organic potassium salts) earth, sand, etc. This wool is washed with water to remove these impurities therefrom. After evaporation of the washing or scouring water, a greasy, earthy mass is obtained.

The Applicant initially had the idea of valorizing wool scouring waters by concentrating them to approximately 70% dry matter by evaporation and thermocompression, and then pyrolyzing, at beetween 400° and 600° C., the sludge thus obtained in a rotary furnace, with hot gas counter-flow. He thus obtained, on one hand, essentially a mineral material in the form of ashes composed of approximately 70% of granulates and approximately 30% of fine dusts and, on the other hand, by passing the pyrolysis gases through a boiler, high pressure steam used to produce electricity.

The mineral material in question, which is essentially composed of carbon, water-soluble potassium salts, water-insoluble potassium salts, silicates and silica, is used, in powder form (granulates and fine dusts) in agriculture, as a fertilizer.

The granulates are also used as catalyst supports, in particular to sweeten gasolines, or directly to deodorize or bleach liquids.

It has been established, however, that the porous, granular material obtained from this first pyrolysis exhibited a highly irregular performance and, in certain applications, had drawbacks such as insufficient crushing strength and a tendency to disintegrate in the presence of water.

The Applicant thus continued his research with a view to improving this granular material. In this way, he found that, thanks to a second pyrolysis, carried out at temperatures of 700° to 950° C., in particular from 700° to 800° C., and preferably from 700° to 750° C. in a non-oxidizing atmosphere, it was possible to obtain, reproducibly, a porous, granular material that not only exhibited very good crushing strength and did not disintegrate in the presence of water, but also had a far larger specific surface area than the granulates from the first pyrolysis, with microporosity predominating, to the detriment of macroporosity. These new granulates, which can be obtained either by grinding, compacting and granulation, followed by a second pyrolysis, of the mineral material obtained after the first pyrolysis, or by a second, direct pyrolysis of granulates from the first pyrolysis having a particle size ranging from approximately 1 to 5 mm, are capable, in addition, of fixing, by absorption or adsorption, far larger quantities of products such as catalysts.

More precisely, according to one of its aspects, the invention relates to a porous, granular material comprising carbon, silica, water-soluble mineral salts and water-insoluble mineral salts, characterized in that it does not disintegrate in the presence of water and has:

a particle size in the range of approximately 1 to 5 mm;
a crushing strength, or mechanical strength, in the range of 0.75 to 1 MPa;
a density of between 0.7 and 0.8 g/cm$^3$;
a BET specific surface area of between 100 and 200 m$^2$/g;
a microporous volume of between 0.25 and 1 cm$^3$/g; and
a carbon content of 8 to 11 weight %, the balance being essentially made up by a mineral matrix of base nature, comprising a crystalline phase of insoluble aluminosilicates.

In the framework of the present invention, the microporosity is taken as being constituted of pores less than or equal to $18 \times 10^{-10}$ m (18 Å), while the macroporosity is taken as being constituted of pores larger than or equal to $200 \times 10^{-10}$ m (200 Å).

The porous, granular material according to the invention has a particle size at least equal to approximately 1 mm. In the course of its manufacture, that will be described later, if one were to attempt to work with a particle size of less than approximately 1 mm, sludge would be obtained, and not a granular material. The particle size preferably ranges from 1 to 3 mm and, advantageously, from 1 to 2 mm. In all cases, this granular material essentially contains the following elements: carbon, silicium, oxygen, sodium, potassium, magnesium, calcium, aluminum and iron. It has a high silica content, generally in the order of 45 weight %.

It is composed of a high proportion of black grains, which include carbon, silica essentially in the form of quartz, silicates such as magnesium and potassium silicate having the formula $K_2MgSi_3O_8$ and aluminosilicates of the alkaline feldspar type such as sodium aluminosilicate having the formula $NaAlSi_3O_8$ and gismondine or potassium aluminosilicate having the formula $KAlSi_3O_8$ or of the feldspathoid type, less rich in silica than the feldspars, such as kaliophilite having the formula $KAlSiO_4$, or kalsilite having a not very different formula. This porous, granular material further comprises white grains, essentially composed of silica, primarily in the form of quartz.

The presence of aluminosilicates in the porous, granular material according to the invention would appear to be due to a more or less ordered rearrangement of the alkaline cations with the silicon and aluminum ions present in the starting material, a rearrangement which partly transforms the soluble silicates into insoluble aluminosilicates.

The granulates obtained according to the prior art already contain a certain proportion of aluminosilicates, in particular gismondine and kaliophilite. The second pyrolysis, which leads to the production of the porous, granular material according to the present invention, modifies the proportions of these aluminosilicates and favorably increases the basicity of the granular material according to the invention, in relation to the known granular material obtained from the first pyrolysis. In addition, the larger proportion of feldspathoid material such as kaliophilite increases the crystallinity of the product, thus enhancing its crushing strength.

For certain applications, in particular when it is used as it is, or as a catalyst support in base catalysis applications, for example for the purpose of sweetening acid petroleum cuts, the porous, granular material according to the invention preferably has a pH value, measured for the washing waters, of over 11.

The crushing strength, or mechanical strength, is more generally between 0.75 and 0.95 MPa.

The BET specific surface area is advantageously between 160 and 200 m$^2$/g.

According to one advantageous form of embodiment, the invention provides a porous, granular material comprising carbon, silica, water soluble mineral salts and water-insoluble mineral salts, characterized in that it does not disintegrate in water and has:

- a particle size ranging from 1 to 3 mm, preferably from 1 to 2 mm;
- a crushing strength, or mechanical strength, of between 0.75 and 0.95 MPa;
- a density of between 0.7 and 0.8 g/cm$^3$;
- a BET specific surface area of between 160 and 200 m$^2$/g;
- a microporous volume of between 0.25 and 1 cm$^3$/g;
- a carbon content of 8 to 11 weight %, the balance being essentially composed of a mineral matrix of base nature, comprising a crystalline phase of insoluble aluminosilicates; and
- a pH value, measured for the washing waters, of over 11.

According to another of its aspects, the invention provides a process for the manufacture of the porous, granular material according to the invention, characterized in that it essentially comprises the steps of:

1. obtaining an essentially mineral material, having, or having not, a particle size ranging from approximately 1 to 5 mm, preferably from 1 to 3 mm, and, advantageously, from 1 to 2 mm, obtained by concentrating wool scouring waters to obtain a dry matter content of approximately 70%, pyrolysis of the resulting concentrate at a temperature of between 400° and 600° C., with protection from air and cooling;

2. subjecting this material, if necessary, to grinding compacting, granulating and screening operations to obtain a granulate having a particle size ranging from approximately 1 to 5 mm, preferably from 1 to 3 mm and, advantageously, from 1 to 2 mm;

3. subjecting the essentially mineral starting material with a particle size ranging from approximately 1 to 5 mm, preferably from 1 to 3 mm and, advantageously, from 1 to 2 mm, or the granulate obtained in step 2, to a second pyrolysis, in a non-oxidizing atmosphere, at a temperature which is gradually increased from a value ranging from 250° to 350° C. to a value ranging from 700° to 950° C., for a total duration of 15 to 60 minutes; and 4. cooling the granulate thus obtained, with protection from air, and under conditions such that it is not subjected to thermal shock.

The expression "essentially mineral material" is to be taken here as meaning a material in a dispersed form which, according to the grain size of the particles of which it is composed, consists of a granulate, a powder or a mixture of granulate and powder. This material, manufactured by the Applicant, is, as indicated hereabove, already used, in particular, as a fertilizer. The essential steps in its manufacture are represented in diagram form in the SPRINT RA089 document of May 1992, entitled "Gestion de l'eau et traitement des effluents dans l'industrie de lavage de la laine brute" (Water management and processing of effluents in the raw wool scouring industry). Additional details regarding a method of obtaining the "essentially mineral material" used according to the invention are given hereinafter.

Wool scouring water that contains wool grease, suint, earth and sand is subjected to primary evaporation in several steps, which brings its dry matter concentration to approximately 50 weight %. For this purpose, use can be made of evaporators composed of a bundle of tubes through which flows the liquor to be evaporated and of a separator in which the liquor is separated from the evaporation vapors which contain, in addition to water vapor, volatile products such as ammonia, amines and fatty alcohols.

The bundle of tubes is heated on the outside with steam or re-compressed vapors which, upon condensing, transmit their latent vaporization heat to the liquor to be evaporated, which falls in the form of a thin film inside the tubes.

The concentrate thus obtained is then subjected to a secondary evaporation in forced circulation evaporators whose tube bundles it fills. The concentrate or liquor is heated all along the tubes and evaporation takes place by expansion at the outlet from the bundle of tubes. Following this secondary evaporation, a sludge is obtained which has a dry matter concentration of approximately 70 weight %.

For the purpose of carrying out evaporation, use is made of the delay in boiling, which is defined as being the difference between the boiling point of a liquid and the boiling point of water under the same conditions. The delay in boiling is determined by the concentration of soluble mineral and organic materials in the boiling liquid. It is measured, in practice, by taking the temperature difference existing between the boiling liquid and the water vapor that tops it. As a result, it enables the operator to estimate the dry materials content of the concentrate obtained.

The concentrate obtained following the secondary evaporation step is composed of:

- organic materials (suint and "suintine"): approximately 25%;
- water: approximately 30 to 35%; and
- mineral materials, earths, potassium hydroxide, sodium hydroxide, etc.: balance to make up 100%.

This concentrate is sent to a pyrolyzer which can be composed of a rotary furnace, a multi-level furnace of the NICHOLS-HERRESHOFF type or a furnace with rotary soles of the NICHOLS type. Pyrolysis is carried out therein at temperatures of between 400° and 600° C. It enables the concentrate to be transformed by evaporation of the water and of the light organic materials, thermal cracking of the heavy organic materials, softening of the low melting point mineral salts, coating of the melted salts with the earths and granulation of the mineral material. The requisite temperatures are maintained in the furnace by counter-flow circulation of the gases emanating from a hot gas generator (using, for example, natural gas) and the recycled pyrolysis gases. The essentially mineral material leaving the pyrolizer is then cooled down, for example in a tubular rotary cooler, swept by a counter-flow of cold air inside and of water outside, and then recovered.

The essentially mineral material that can be obtained after this first pyrolysis, and which is used in the implementation of the process according to the invention, contains carbon, suint, water-soluble salts, in particular potassium ones, water-insoluble salts, in particular potassium ones, silicates and silica. It is generally composed of grains with a very "open" particle size distribution, that is to say covering a wide range of approximately 30 µm to 40 mm.

When one has a material with such an "open" particle size distribution, before subjecting it to the second pyrolysis in step 3 according to the invention, it is necessary to process it to give it the requisite particle size.

For this purpose, the material is ground in such a way that all the grains have a size of less than 1 mm, and then it is subjected to a compacting treatment to transform it into high density plaquettes, which are then transformed into a granulate having the required dimensions, namely a particle size ranging from 1 to 5 mm, preferably from 1 to 3 mm and, advantageously, from 1 to 2 mm.

In order to improve the porosity of the final product, that is to the say the porous, granular material according to the invention, one can, at the time of compacting, add, for example petroleum pitch or coal tar pitch, in a proportion of 5 to 10 weight %, in relation to the weight of the powder obtained following grinding.

In addition, in order to modify the characteristics of the final product, such as its ability to provide places favoring catalysis effects brought into play in certain reactions taking place in oil or chemical industry processes, sludges containing metals such as iron, copper, titanium, vanadium and nickel, or salts of such metals, can also be added, at the time of compacting, in the form of a powder having a suitable particle size.

The treatments, if any, carried out in step 2, make it possible not only to obtain a granulate having the requisite particle size, but also to introduce additives designed to modify the characteristics of the final product.

When one has a raw material obtained from the first pyrolysis composed solely of a granulate with a particle size at least equal to approximately 1 mm, it is not necessary to subject it to the grinding, compacting and granulation treatments outlined hereabove. It can be subjected directly, after screening, if necessary, in order to obtain grains having the requisite size, to the second pyrolysis in step 3.

The granulate of the requisite size, resulting or not resulting from the treatments of step 2, is then subjected to pyrolysis, in a non-oxidizing atmosphere, at a temperature that is gradually increased from a value ranging from 250° to 350° C. to a value ranging from 700° to 950° C. for a total duration of 15 to 60 minutes, in a furnace. This furnace can be a furnace of the same type as that used for pyrolizing the concentrate of the wool scouring waters, but capable of withstanding higher temperatures. Use is preferably made, however, of a rotary furnace having refractory walls.

In a rotary furnace, the total pyrolysis time is generally from 15 to 30 minutes.

It is also possible, however, to use a static furnace. The total pyrolysis time is then generally from 40 to 60 minutes.

The temperatures at the furnace input are between 250° and 350° C. approximately, and the furnace output temperatures are between 700° and 950° C. approximately.

These temperatures are maintained in the furnace by the counter-flow circulation of hot gases, for example natural gas, obtained from a gas generator fed by a burner.

The atmosphere in the furnace must be non-oxidizing and is preferably a reducing atmosphere.

To provide a reducing atmosphere, the recycled gases from the pyrolysis step can advantageously be mixed, in the gas generator, with the gases supplied by the burner.

The pyrolized granulate is then cooled down, in the absence of air and under conditions such that it is not subjected to thermal shock, for example in fine sand, from which it is then separated by screening or, better still, in a double jacketed tube through which cold water (approximately 15° to 20° C.) is circulated, for example through a "water screw".

In order to obtain the porous, granular material corresponding to the advantageous form of embodiment of the invention described earlier, the pyrolysis temperature must not exceed 750° C.

Consequently, according to a preferred form of embodiment, the process according to the invention defined hereabove is characterized in that the second pyrolysis is conducted at a temperature which is gradually increased from a value ranging from 250° to 350° C. to a value ranging from 700° to 750° C.

The porous, granular material according to the invention can, by reason of its advantageous physico-chemical characteristics, such as, in particular, high crushing strength, high specific surface area and absence of disintegration in water, be used in numerous and varied applications in which use is normally made of activated charcoal, often with lower efficiency and/or under more complex conditions.

In fact, this material behaves like an absorber, has the strength of an aluminosilicate and exhibits a chemical reactivity of the base type.

It can be used as it is or after washing with water for the purpose of extracting the water-soluble salts therefrom, for example to purify, in particular, to deodorize liquids containing phenolic residues. It can thus be used, for example, to deodorize the condensates of wool scouring waters or the condensates of stripping by steam distillation of petroleum products.

It can also be used as it is as a catalyst in certain oxidation reactions of major industrial importance, such as the oxidizing coupling of methane, which is a reaction designed to transform this hydrocarbon, in the presence of oxygen, into higher hydrocarbons, in particular with two carbon atoms. The use of the porous, granular material according to the invention in this reaction leads to the production of ethylene ($C_2H_4$) and ethane ($C_2H_6$) with a very favorable ethylene-ethane ratio by comparison with the other catalysts normally used in this reaction.

It can further be used as it is as a catalyst support. In this case, it is impregnated, according to the usual techniques well known to the man of the art, with the chosen catalyst, which can, for example, be a cobalt salt, to remove the sulfur-containing organic compounds giving rise to unpleasant odors, contained, in particular, in water, or a phthalocyanine, such as cobalt phthalocyanine, to neutralize the free fatty acids, for example in the wool grease or suintine, to bleach it prior to its valorization treatment.

The porous, granular material according to the invention can also be used as a catalyst support in different applications in the petrochemical field, after washing with water to extract the soluble mineral salts therefrom.

Thus, this material, after washing with water, can be impregnated with a metallic chelate, for example a phthalocynanine, in proportions of from 1 to 5 kg/m$^3$, to form a composite that can be used in the sweetening of petroleum cuts. The speed of passage of the petroleum cuts to be sweetened is considerably increased in relation to the composites of the prior art, in particular in relation to those obtained with the granular starting material (the granular material of the first pyrolysis), which corresponds to a major productivity increase (see Example 8 in the "experimental section" that follows).

It can further be subjected to a "purification" treatment other than washing with water, designed to permit its use in applications other than those mentioned above.

Thus, it may be advantageous to remove, at least partially, the carbon that it contains in order to obtain an even more mineral material, for example by calcining at temperatures of over 320° C.

Examples of applications of the porous, granular material according to the present invention are given by way of illustration in the experimental section that follows.

The figures in the appended drawings represent:

FIG. 1: the flow sheet for a unit for manufacturing the porous, granular material according to the invention from the known product of the first pyrolysis of the wool scouring waters, using a pyrolizer of the rotary furnace type.

Figure 2:
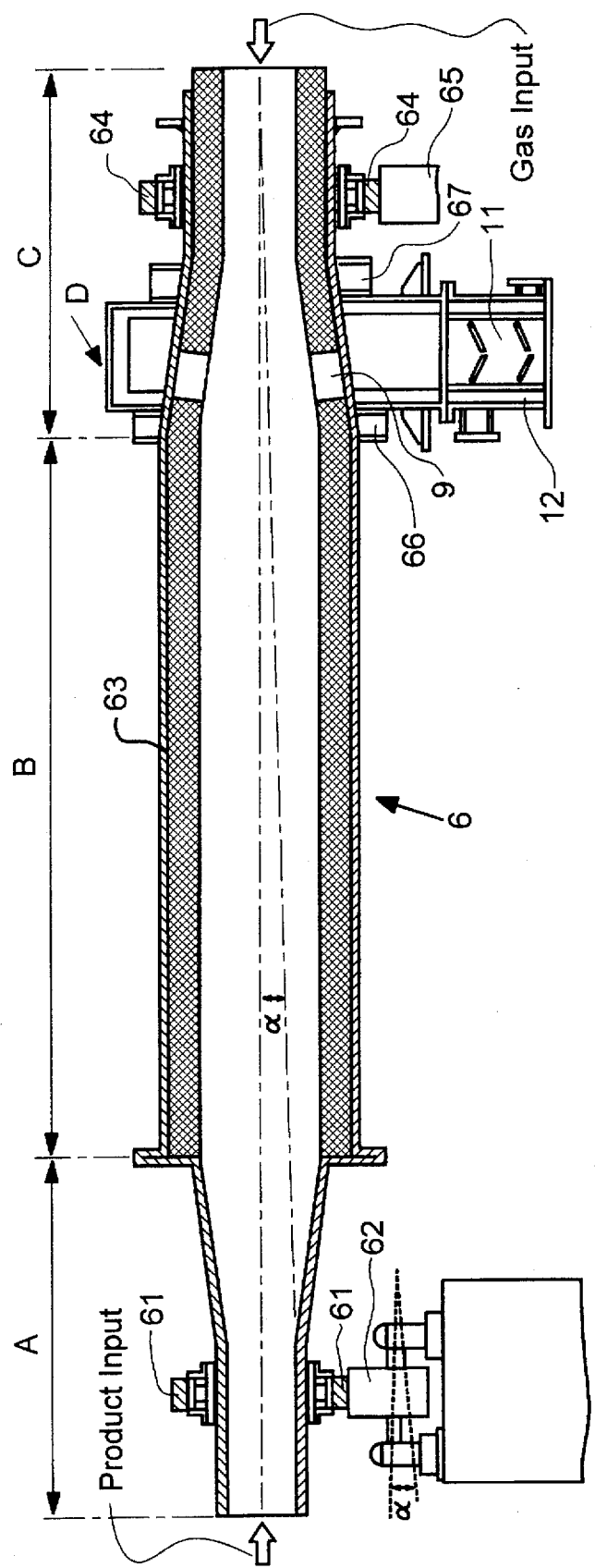

FIG. 2: a vertical sectional view of the furnace used in this manufacturing unit.

These figures will be described in the experimental section that follows, in connection with an example of a form of embodiment of the process according to the invention.

EXPERIMENTAL SECTION

Example 1

Manufacture of the porous, granular material according to the invention

The starting material obtained from the first pyrolysis of the wool scouring waters and the manufacture of which has already been described, was brought, by grinding, to a particle size of less than 1 mm. It can be mixed at this stage with recycled fine particles, obtained by cyclone filtration of the gases from the first pyrolysis. The mixture was then sent to a unit composed of a preparation unit for the weighing of the components (previous mixture and fine particles of less than 1 mm, recycled after granulation) and of a unit for compacting, which transforms the powdery materials into high density plaquettes. The particles were agglomerated by the pressure applied by a hydraulic system to the molding wheels of the compactor. In this example, the width of a molding wheel was 14.5 cm and the pressure applied was in the order of $7.10^4$ to $8.10^4 N$ (7 to 8 tons) per cm of wheel width.

Correct dimensioning of the compactor, in particular of its wheels, enables 100% compacting efficiency to be obtained.

The high density plaquettes were then transformed, in a granulation unit, into a granulate having the requisite dimensions, namely from 1 to 2 mm in the present case. The granulation yield was in the order of 30%. For a particle size of 1 to 3 mm, it would be in the order of 50%.

After screening, the granulate of over 2 mm was recycled to the granulator and the fine particles of less than 1 mm were recycled to the compacting unit.

The 1 to 2 mm sized granulate 1 was distributed on a conveyor belt 2 at the rate of 100 kg/hr and then loaded into a hopper 3, the base of which was equipped with an alveolate lock or rotatory sluice 4. They were thus regularly loaded, via a caisson 5, into a rotary tubular furnace 6 through which they circulated in counter-flow to hot gases with a very low oxygen content. At the output from furnace 6, these gases passed through caisson 5 and exited therefrom at 7, while the excess granulate was extracted by means of the lower hopper 8 of caisson 5 for recycling.

At the input to furnace 6, granulate 1 was subjected to a temperature of 250° to 350° C. and, at its output, to a temperature of 700° to 750° C. The dwell time for the granulate in the furnace was approximately 30 minutes.

The granulate left furnace 6 via a set of ports 9 and an output cone 10. It passed through a double air lock 11 cooled by a double jacket 12 through which cooling air at 10° C. flowed at a rate of 350 m³/hr (normal), this air being supplied by a fan 13.

The granulate was then introduced into an endless screw conveyor 14 having a length of 5 m and a diameter of 18 cm, cooled by a double jacket 15 having an annular space of 4 mm, through which water at 15° C. under a pressure of 5.5 bar circulated at a rate of 7.2 m³/hr. The granulate was thus cooled by conduction to a temperature of 60° to 70° C. and was extracted at 16 from endless screw 14, at this temperature, at the rate of approximately 95 kg/hr. The water left the double jacket at approximately 18° C.

The gases used in furnace 6 arrived from the low outlet of a gas generator 17 (schematically represented upside down, for the purpose of simplification), the upper part of which was supplied with combustion gases of natural gas from a burner 18, partially cooled by mixing with the recyled pyrolysis gases introduced into a recycled gas distributor 19.

The natural gas was injected into a burner 18, by means of a regulating valve 20, at a rate of 8 m³/hr (normal) and the combustion air, of which there was a small excess, was injected into burner 18 by means of a fan 21, at a rate of 105 m³/hr (normal). The recycled pyrolysis gases, at a temperature of 245° C., were injected into distributor 19, by means of a fan 22, at a rate of 210 m³/hr (normal).

The gases from generator 17 entered rotary furnace 6 at an adjustable temperature in the region of 800° C. and exchanged their heat with the furnace walls of refractory material and the granulates. The latter were heated up to 750° C., while the gases cooled down.

The gases leaving furnace 6 via caisson 5 were laden with dusts or fine particles produced by the erosion of the granulate in the furnace. They were conveyed, at 245° C. and at a flow rate of 326 m³/hr (normal), into a cyclone filter 23. The filtered gases were either extracted from the installation by means of regulating valve 24, at 245° C. and at a rate of 116 m³/hr (normal) in order to be possibly reused, in the manufacture of the initial product, or recycled via regulating valve 25 and fan 22 to gas generator 17.

This unit can function in automatic mode thanks to a set of three regulating loops and a set of main and secondary safety devices.

The three regulating loops were essentially composed of the following.

1. Hot gas temperature regulation:

The gases from generator 17 must have a temperature that is as constant as possible, around a set-point fixed by the operator (850° C. in the case of this example). The flow rate of recycled gases is therefore varied according to the real temperature measured for the gases on their entering furnace 6. This loop thus comprised:

- a thermocouple for measuring the temperature of gases 26;
- a proportional regulator, not shown, mounted in the control room; and
- a valve 25 for regulating the flow rate of the recycled gases.

2. Regulation of the heat load of the rotary furnace:

The output temperature of the gases was measured, downstream of cyclone filter 23 (245° C. in this example), and any deviation of the measurement from the set-point fixed by the operator was corrected, by actuating the opening or closing of the electrovalves of natural gas burner 18. This loop thus comprised:

- a temperature (250°–350° C.) measuring thermocouple 27;
- a three-threshold regulator (dry contacts) 28; and
- three electrovalves (not shown) mounted in parallel on the natural gas circuit of the burner.

3. Regulation for obtaining a depression in the hot gas generator:

For safety reasons, it is preferable to cause hot gas generator 17 to operate at a slight depression. For this purpose, the pressure of the firebox was measured, and the flow rate of the gases extracted from the unit was adjusted until values that were as close as possible to the set-points were obtained. This loop thus comprised:

- a pressure sensor 29, mounted on generator 17;
- a proportional regulator, not shown, mounted in the control room; and
- a regulating shutter, or regulating valve, 24 for discharging the gases, with a pneumatic servo-motor, mounted on the gas discharge circuit.

The horizontal, direct heating type rotary furnace 6, used in this example, is shown in FIG. 2. It was composed of three sections, A, B and C, connected by flanges, and had an overall length of 6 m. It was slightly inclined, towards the granulate output, for example at an angle α of approximately 2° in relation to the horizontal direction.

Section A of the product input, which was made of metal, was cylindro-conical. It was provided, in its cylindrical portion, with a high band 61 resting on four support rollers 62 driven by a motor for substantially horizontal rotation, not shown.

Section B, in which pyrolysis properly speaking was carried out, was also made of metal and was internally fitted with a refractory lining 63, made, for example, of 11 cm "knife bricks" (fire bricks which contain 30–35% of $Al_2O_3$ and have a density of 2).

Section C was also made of metal and was likewise internally fitted with a refractory lining 63. The said section C comprised a conical portion having ports 9 distributed at regular intervals over its circumference for discharging the pyrolized product, and a cylindrical portion for admitting the pyrolysis gases, having a low band 64 resting on four support rollers 65.

The conical portion of section C was entirely surrounded by a annularly shaped enclosure D, fixed in relation to the rotating assembly A, B, C which formed the furnace, and was designed to receive the pyrolized granulate exiting via ports 9.

The seal between enclosure D and furnace 6 was provided by joints 66 and 67. The lower portion of enclosure D communicated with double output lock 11.

Example 2

Comparison between the porous, granular material obtained according to Example 1 and the starting product (granulate from the 1st, pyrolysis)

|  | GRANULATE FROM 1ST PYROLYSIS | GRANULATE FROM EXAMPLE 1 |
|---|---|---|
| Crushing strength | maximum 0.2 MPa | maximum 1 MPa |
| Impregnation (fixing of phthalocyanine) ($kg/m^3$ of granulate) | 2.5 to 3 | 3 to 4 |
| Specific surface area | 30 $m^2/g$ | 200 $m^2/g$ |
| Microporous volume ($cm^3/g$) | 0.05 to 0.25 | 0.25 to 1 |
| Basicity* | 5 to 6% | 6 to 8% |

*Basicity is expressed as the percentage of residual potassium in the product.

It is to be noted that microporosity increases in a ratio of as much as 1 to 5 when the granulate of the first pyrolysis is processed as in Example 1.

Example 3

Deodorization of water containing phenolic compounds

1st. test:

Water containing phenolic compounds has an unpleasant odor.

Treatment of this water by percolation through the porous, granular material according to the invention reduced the concentration of pollutant elements.

Water flow rate: 0.5 to 1 v/v/hr (volume/volume of material/hr).

TABLE 1

|  | BEFORE | AFTER |
|---|---|---|
| C O D* | 400 mg/l | 80 mg/l |
| Phenols | 24 mg/l | 0 to 3 mg/l |

*C O D = Chemical oxygen demand.

2nd. test

A mixture consisting of an evaporation condensate of wool scouring water and noncondensable components from the evaporation of this same scouring water, in the initial proportions of the scouring water, that is to say 95/5 volume %, was treated as in the 1st. test.

Water flow rate: 0.2 to 0.5 v/v/hr.

TABLE 1b

|  | BEFORE | AFTER |
|---|---|---|
| C O D | 1000 mg/l | 140 mg/l |
| Phenols | 14 mg/l | nil |

Example 4

Deodorization of evaporation condensates of the wool scouring waters

It is of interest to deodorize the evaporation condensates of wool washing in order to reuse them for wool washing or scouring.

The product obtained in Example 1 was washed with water, at 70° C., to extract the soluble salts therefrom.

1st. test

Two columns were used in succession, each column containing 150 $cm^3$ of water washed and dried product. The condensed water was diffused through the support, at a rate of 0.47 m/hr, in an ascending stream. The flow rate was 0.5 v/v/hr, i.e. 150 $cm^3$/hr.

The daily volume thus deodorized was 3.6 liters.

2nd. test

In this test, water was passed in succession through three columns, each column containing 500 $cm^3$ of the product obtained according to Example 1, water washed and dried. The speed of passage was 0.14 m/hr in an ascending stream. The flow rate was 0.2 v/v/hr, i.e. 300 $cm^3$/hr.

The daily volume thus deodorized was 7.2 liters.

At the end of the cycle, the support was reactivated thermally in the furnace between 600° and 650° C., for 3 hours, with protection from air.

Example 5

1st. test:

Procedure was as for Example 4, 2nd. test.

18 liters of evaporation condensates were diffused through the product of Example 1, treated as described in Example 4, prior to saturation of the product. The product or support was considered to be saturated when, in the columns, it no longer fixed more than 50% of the initial chemical oxygen demand (COD) of the non-treated water.

In addition, the phenol concentration was quantitatively assessed using 4-amino-antipyrine which, upon condensing with the phenols, develops a coloring.

The results obtained are grouped together in Table 2.

TABLE 2

| DEODORIZED CONDENSATE VOLUME* (1) | CONDENSATE VOL.: SUPPORT VOL. RATIO | COD (mg/l) | PHENOLS (ppm) |
| --- | --- | --- | --- |
| 0 | — | 400 | 24 |
| 2.1 | 7 | 15 | 0 |
| 5.1 | 17 | 20 | 0 |
| 10 | 33 | 20 | 0 |
| 15 | 50 | 80 | 3 |
| 18 | 60 | 180 | 16 |

*The measurements were carried out during the cycle, after deodorization of 2.1 l, 5.1 l, etc.

2nd. test

Procedure was as for the 1st. test hereabove.

TABLE 2b

| DEODORIZED CONDENSATE VOLUME* (1) | CONDENSATE VOL.: SUPPORT VOL. RATIO | COD (mg/l) | PHENOLS (ppm) |
| --- | --- | --- | --- |
| 0 | — | 1000 | 14 |
| 7.2 | 4.8 | 80 | 0 |
| 14.4 | 9.6 | 100 | 0 |
| 21.6 | 14.4 | 120 | 0 |
| 28.8 | 19.2 | 140 | 0 |
| 36.0 | 24.0 | 150 | 0 |
| 43.2 | 30.8 | 190 | 0 |
| 50.4 | 33.6 | 200 | 0 |

*Same comment as for Table 2.

Thermal regeneration in an inert medium enabled the support to be reused in treating condensates by percolation, this holding good as long as thermal reactivation was possible.

Example 6

Deodorization of steam distillation (stripping) condensates

Procedure was as in Example 4, 1st. test, and Example 5, 2nd. test.

The results obtained are grouped together in Table 3.

TABLE 3

| DEODORIZED CONDENSATE VOLUME* (1) | CONDENSATE VOL.: SUPPORT VOL. RATIO | COD (mg/l) | PHENOLS (ppm) |
| --- | --- | --- | --- |
| 0 | — | 140 | 16 |
| 2.1 | 7 | 6 | 0 |
| 5.1 | 17 | 7 | 0 |
| 10 | 33 | 10 | 0 |
| 15 | 55 | 32 | 5 |
| 18 | 60 | 70 | 7 |

*Same comment as for Table 2.

Example 7

Neutralization of acidity in fats

Porous, granular material according to the invention, obtained from a second pyrolysis at a maximum temperature of 750° C. for 50 minutes, was calcined in an oxidizing atmosphere at 400° C., for 8 hours, to increase its surface basicity.

With the porous, granular material thus treated, it proved possible to, concommittantly, neutralize fatty acids and to accelerate the decomposition of the peroxides.

Suintine was placed in a hydro-alcoholic solution to which 130 volumes hydrogen peroxide had been added. The solution was then diffused in an ascending stream through the granular material treated as described above, at a flow rate of 0.1 v/v/hr.

Before and after the treatment, the free acidity, the peroxide number and the Lovibond color of the suintine were measured.

The free acidity measurement carried out consisted in expressing the acidity as the percentage of oleic acid present in the substance to be analyzed. This is a way of expressing the acid number.

The peroxide number was given by the number, expressed in milliequivalents, of active oxygen contained in 1000 g of substance.

Measurement of the Lovibond color is a measurement of the color of an oil or a melted fat. It is a comparative measurement which is carried out on a Lovibond comparator as follows. Melted suintine was placed in an 0.635 cm (¼ inch) cell. The cell was placed in the comparator and colored plates (red, blue and green) or filters were associated therewith in order to obtain the same color as that of the suintine. When this result was obtained, the color was expressed by the numbers of the filters used (for example yellow 20).

In the present case, only the value or number of the yellow filter was used.

The results are expressed as follows: Lovibond color, ¼ inch cell, yellow=for example, 20.

The results of these 3 measurements are grouped together in Table 5 thereafter.

TABLE 5

| | Free acidity (%) | Peroxide number | Lovibond color (yellow) |
| --- | --- | --- | --- |
| Before | 4 | 90 to 12 | >80 |
| After | 0.2 | 40 to 8 | 20 |

Example 8

Sweetening of a petroleum cut including sulfur-containing compounds

A petroleum cut (boiling point 135° to 250° C.) including 120 ppm of sulfur-containing compounds (mercaptans) was sweetened using, on one hand, the granular material of the first pyrolysis which absorbed little catalyst (approximately 2.5 kg/cm$^3$ of cobalt phthalocyanine) and, on the other hand, the granular material according to the invention obtained by pyrolysis for approximately 1 hour at a maximum temperature of 700° C., which absorbed far more catalyst (approximately 4.7 kg/cm$^3$ of cobalt phthalocyanine).

It was found that, for the same results (mercaptan content of the effluents between 5 and 10 ppm), the volume of petroleum cut treated per hour was doubled with the granulate according to the invention, in particularly due to an increase in the quantity of catalyst that could fixed on this granulate.

I claim:

1. A porous, granular material comprising carbon, and silicon, oxygen, sodium, potassium, magnesium, calcium, aluminum and iron combined at least partially in the form of silica, of water-soluble Silicate mineral salts and of water-insoluble aluminosilicate mineral salts, said mineral salts being present in a mineral matrix which, in the presence of water, has the properties of a base, which granular material does not disintegrate in the presence of water and has:

(a) a particle size in the range of from approximately 1 to 5 mm;

(b) a crushing strength, or mechanical strength, in the range of from 0.75 to 1 MPa;

(c) a density of between 0.7 and 0.8 g/cm$^3$;

(d) a BET specific surface area of between 100 and 200 m$^2$/g;

(e) a microporous volume of between 0.25 and 1 cm$^3$/g; and (f) a carbon content in the range of from 8 to 11 weight %, the balance being essentially made up by said mineral matrix, which comprises a crystalline phase of said insoluble aluminosilicates.

2. The porous, granular material according to claim 1, wherein the particle size is in the range of from 1 to 3 mm.

3. The porous, granular material according to claim 2, wherein the particle size is in the range of from 1 to 2 mm.

4. The porous, granular material according to claim 1, wherein:

the particle size is in the range of from 1 to 3 mm;

the crushing strength, or mechanical strength, is between 0.75 and 0.95 MPa;

the BET specific surface area is between 160 and 200 m$^2$/g; and wherein the porous, granular material has a pH value, measured for the washing waters, of over 11.

5. The porous, granular material according to claim 1, wherein the porous granular material has a silica content on the order of 45 weight %.

6. The process for the manufacture of the porous, granular material according to claim 1, which comprises the steps of:

(a) obtaining an essentially mineral material by concentrating wool scouring waters to obtain a dry matter content of approximately 70% and pyrolizing the resulting concentrate at a temperature of between 400° and 600° C., with protection from air and cooling;

(b) subjecting the essentially mineral material to grinding, compacting, granulating and screening operations to obtain a granulate having a particle size ranging from approximately 1 to 5 mm;

(c) subjecting the granulate obtained in step (b), to a second pyrolysis, in a non-oxidizing atmosphere, at a temperature which is gradually increased from a value in the range of from 250° to 350° C. to a value in the range of from 700° to 950° C., for a total duration of 15 to 60 minutes; and (d) cooling the granulate thus obtained, with protection from air, and under conditions such that it is not subjected to thermal shock.

7. The process according to claim 6, wherein at the time of compacting, petroleum pitch or coal tar pitch, in a proportion of 5 to 10 weight % in relation to the weight of the material obtained following grinding, and/or sludges containing metals or metal salts, are added.

8. The process according to claim 6, wherein the second pyrolysis is carried out in a rotary furnace fitted with refractory walls.

9. The process according to claim 6, wherein the atmosphere in the furnace is a reducing atmosphere.

10. The process according to claim 6, wherein the granulate is cooled in fine sand or in a tube having a double jacket through which cold water circulates.

11. The process according to claim 6, wherein the second pyrolysis is carried out at a temperature which is gradually increased from a value in the range of from 250° to 350° C. to a value in the range of from 700° to 750° C.

12. The process for the manufacture of the porous, granular material according to claim 1, which comprises the steps of:

(a) obtaining an essentially mineral material having a particle size in the range of from about 1 to 5 mm, by concentrating wool scouring waters to obtain a dry matter content of approximately 70% and pyrolizing the resulting concentrate at a temperature of between 400° and 600° C., with protection from air and cooling;

(b) subjecting the essentially mineral material to a second pyrolysis, in a non-oxidizing atmosphere, at a temperature which is gradually increased from a value in the range of from 250° to 350° C. to a value in the range of from 700° to 950° C., for a total duration of 15 to 60 minutes; and (c) cooling the granulate thus obtained, with protection from air, and under conditions such that it is not subjected to thermal shock.

13. The process according to claim 12, wherein the second pyrolysis is carried out in a rotary furnace fitted with refractory walls.

14. The process according to claim 12, wherein the atmosphere in the furnace is a reducing atmosphere.

15. The process according to claim 12, wherein the granulate is cooled in fine sand or in a tube having a double jacket through which cold water circulates.

16. The process according to claim 12, wherein the second pyrolysis is carried out at a temperature which is gradually increased from a value in the range of from 250° to 350° C. to a value in the range of from 700° to 750° C.

17. A method of purifying liquids, comprising contacting a liquid to be purified with the porous, granular material according to claim 1.

18. A method of catalyzing an oxidation reaction, comprising contacting gas reactants with the porous, granular material according to claim 1.

19. A method of forming a catalyst support, comprising impregnating the porous, granular material according to claim 1 with a catalyst.

20. A method of forming a composite catalyst useable in petrochemistry, comprising impregnating the porous, granular material according to claim 4 with a metallic chelate.

* * * * *